Figure 2:
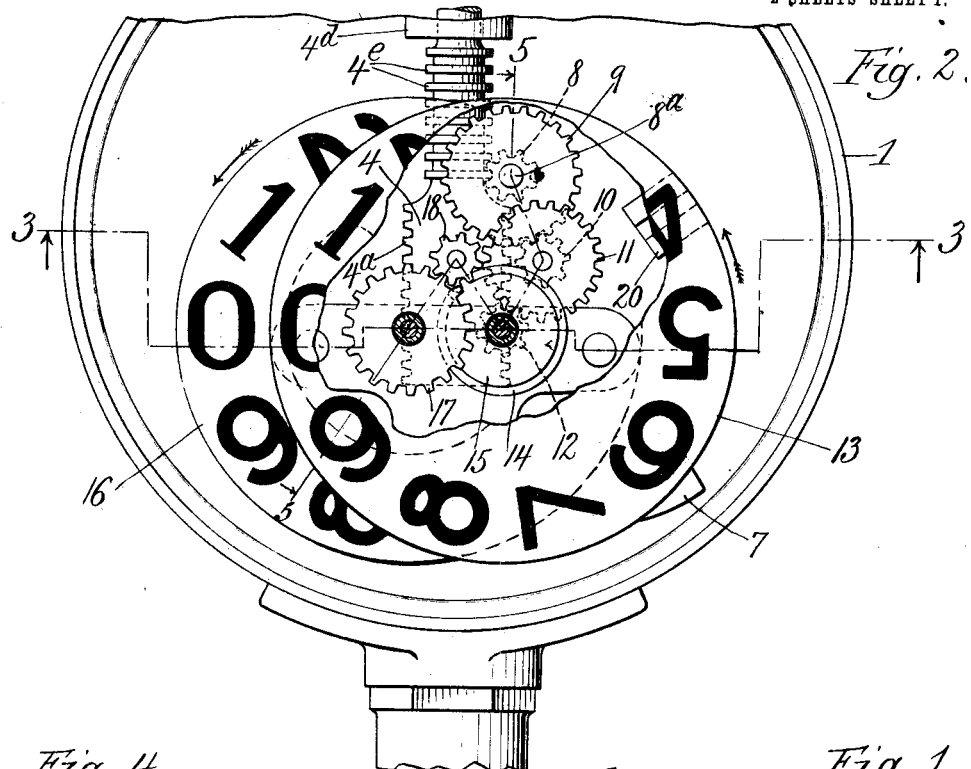

J. K. STEWART.
SPEED INDICATOR.
APPLICATION FILED SEPT. 21, 1911.

1,118,964.

Patented Dec. 1, 1914.
2 SHEETS—SHEET 1.

Witnesses.
Edward T. Wray.
Robt. T. Burton.

Inventor.
John K. Stewart.
by Burton & Burton
his Attys.

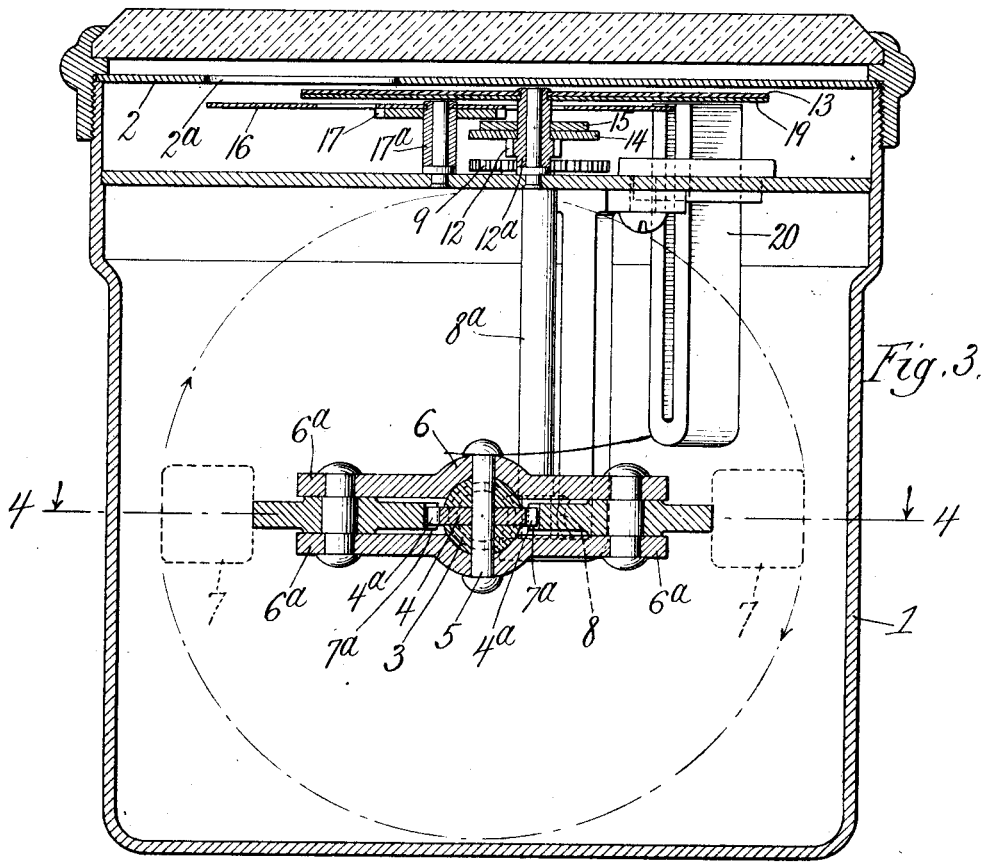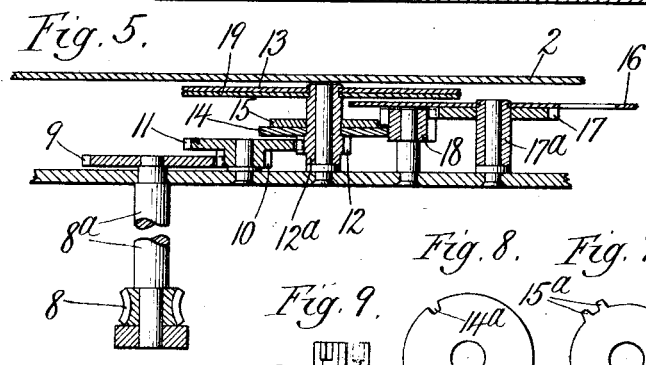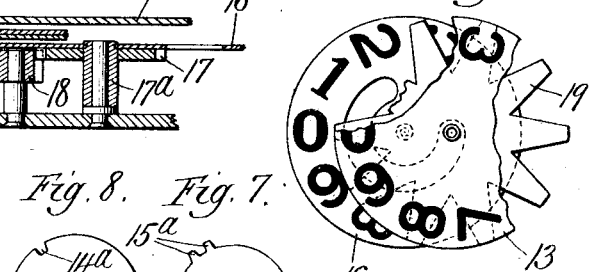

UNITED STATES PATENT OFFICE.

JOHN K. STEWART, OF CHICAGO, ILLINOIS, ASSIGNOR TO STEWART-WARNER SPEEDOMETER CORPORATION, OF VIRGINIA.

SPEED-INDICATOR.

1,118,964.  Specification of Letters Patent.  Patented Dec. 1, 1914.

Application filed September 21, 1911. Serial No. 650,565.

*To all whom it may concern:*

Be it known that I, JOHN K. STEWART, a citizen of the United States, residing at Chicago, in the county of Cook and State of Illinois, have invented new and useful Improvements in Speed-Indicators, of which the following is a specification, reference being had to the accompanying drawings, forming a part thereof.

The purpose of this invention is to provide an improved form of speed measuring instrument by which the speed indicated may be read directly in figures corresponding to the speed without any reference to a graduated scale such as is found in most instruments of this class.

The invention consists in certain features and elements of construction described and shown in the drawings as indicated in the claims.

Figure 4:
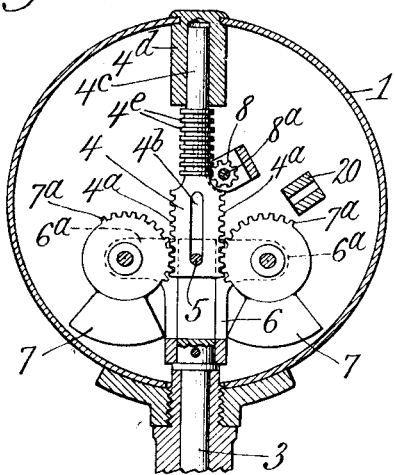
Figure 1:
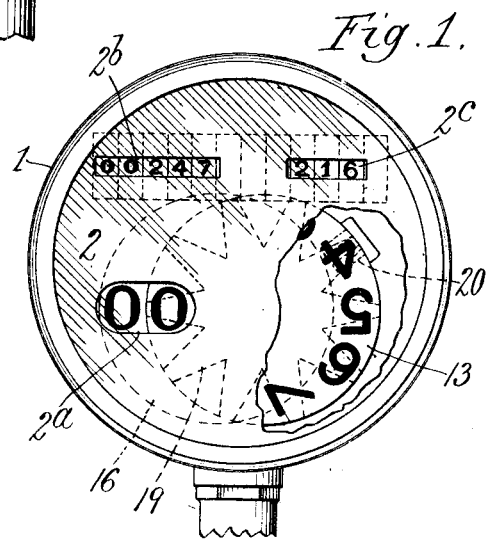

In the drawings: Figure 1 is a front elevation of a speed indicator embodying this invention, certain parts being broken away. Fig. 2 is an interior elevation, certain portions being broken away to reveal the mechanism. Fig. 3 is a section taken as indicated at the line 3,—3, on Fig. 2. Fig. 4 is a section taken as indicated at the line 4,—4, on Fig. 3. Fig. 5 is a staggered section taken as indicated at the line 5,—5, on Fig. 2. Fig. 6 is a detail face view of the speed indicating disks. Fig. 7 is a detail of the toothed plate, 15. Fig. 8 is a detail view of the notched plate, 14. Fig. 9 is a detail elevation of the idler pinion, 18.

As may be understood from Fig. 1, the speed indicator which is the subject of this invention is arranged within a case 1, having a cover plate, 2, provided with a window, $2^a$, at which it is arranged that there shall appear numbers corresponding to the speed which is being measured by the instrument. Since the instrument shown in the drawings is designed for use in connection with auto mobiles and where the speed is desired to be known in terms of miles per hour, the numbers appearing at the window, $2^a$, will correspond to the speed as measured in these terms, and as usual there is incorporated in the same case, 1, additional mechanism for registering the total number of miles traveled as well as the distance traveled in a single trip by the vehicle, these records being indicated at windows, $2^b$ and $2^c$, respectively.

Passing now to Fig. 4, the speed-responsive mechanism may be seen to comprise a shaft, 3, intended for connection with the rotating element whose speed is to be measured, and slotted at its upper end to receive a flattened bar, 4, having racks, $4^a$, cut on two of its opposite faces and guided for longitudinal movement in the slot of the shaft by a pin, 5, extending through the latter and accommodated in a longitudinal slot, $4^b$, in the bar, 4. The shaft, 3, is further provided with a yoke, 6, rigid upon it and pivotally supporting, in its laterally extending arms, $6^a$, a pair of weights, 7—7, having segmental gears, $7^a$, cut upon them in position to mesh with the racks, $4^a$, of the bar, 4. The rotation of the shaft, 3, together with the yoke, 6, will cause the weights, 7—7, by reason of the centrifugal force thus generated, to swing laterally outward and upward about their pivots, thus rotating their gear segments, $7^a$, and drawing the rack bar, 4, downward in the slotted end of the shaft, 3.

Above the racks, $4^a$, the bar, 4, is cylindrical and has formed upon it a series of peripheral flanges, $4^e$, equally spaced apart from one another so as to constitute a second rack and to mesh with a pinion, 8, mounted fast upon a shaft, $8^a$, journaled in the casing. The upper end, $4^c$, of the bar, 4, is also cylindrical and is journaled in a bearing block, $4^d$, in which it may both rotate and slide longitudinally. Thus it will be seen that the rotation of the pinion, 8, which is caused by any up and down movement of the rack bar, 4, due to variations of speed of the shaft, 3, and consequent movement of the weights, 7—7, may be utilized to actuate any desired form of indicating mechanism.

Fig. 2 illustrates the gear train by which the indicating mechanism, (which is broken away to reveal the train) is connected for actuation by the movement of the pinion, 8. The shaft $8^a$, has rigid with it a gear wheel, 9, meshing with a pinion, 10, and with the latter there is rigid a gear, 11, meshing with the pinion, 12, which carries the units disk, 13, upon its hub, $12^a$, as appears in Figs. 3 and 5. Also, rigid on the hub, $12^a$, are two plates 14 and 15, having respectively upon their peripheries a single notch, 14ª, and a pair of teeth, 15ª, the latter positioned so that the space between them registers with the notch, 14ª. The tens disks, 16, is carried by the hub, 17ª, of a gear, 17, and an idler pinion, 18, by virtue of its special construction serves to connect the units disk and the tens disk and cause a movement of the latter amounting to one step or subdivision thereof for each complete revolution of the former.

Figs. 5 and 9 indicate that every other tooth of the pinion, 18, is of half width only and that the toothed plate, 15, is positioned so that its teeth, 15ª, will mesh with the narrow teeth as well as the wide teeth of the pinion, 18, while the plate, 14, is mounted so as to project into the spaces occasioned by the omission of half of every other tooth of the pinion so as to lock the pinion, 18, against rotation except when the notch, 14ª, registers with one of the full width teeth of the pinion, which it does simultaneously with the actuation of said pinion by the teeth, 15ª, of the plate, 15. At such times the pinion, 18, being rotated by the amount of the two teeth, 15ª, will transmit this much movement to the gear wheel, 17, causing the disk, 16, to advance one division or numeral, the gear, 17, being provided with two teeth for every division of the disk, 16. During the remainder of the revolution of the units disk the plate, 14, serves to lock the tens disk against rotation and thus to preserve proper positioning of its numeral before the window, 2ª.

With the mechanism thus far described, it will be seen that the movement of the speed indicating disks, 13 and 16, would be perfectly continuous and that any slight variation of speed would move the disk, 13, so that only when the speed happened to be an even number of miles per hour would the units figure stand in perfect registration with the window, 2ª, and whenever a fraction of a mile was added to the speed, this figure would be moved out of registration with the window by an amount corresponding to the fractional increment of the speed. Since this condition would often render it difficult to read the numeral at all, and since it is deemed sufficient that the speed be known only to the nearest number of miles per hour, it is preferred to arrange the disk, 13, so that it will move in steps of one subdivision or numeral and will stand at rest with the numeral in perfect registration with the window, 2ª, until the increment of speed amounts substantially to a whole mile per hour. For this purpose the disk, 13, is provided with an auxiliary 10-armed star wheel, 19, of soft iron, back of which there is mounted fixedly in the case, 1, a magnet, 20, for which the arms of the star wheel, 19, are intended to serve, one at a time, as armatures. As each numeral of the disk, 13, comes into position before the window, 2ª, the disk will be retained in such position by the attraction of the magnet, 20, for one of the arms of the star wheel, 19, until the speed of the shaft, 3, is increased sufficiently to overcome this attraction of the magnet, 20 and to permit the disk, 13, to jump ahead by one of its ten sub-divisions. In the case of decreasing speed, the tendency of the weights, 7—7, to return to their normal and lowest position will operate in the same way to return the disk, 13, toward its zero position in steps of one sub-division each.

I claim :—

1. In a speedometer, in combination with a rotating member, a device which responds to change of speed of said member by assuming a different position for each different speed; a magnet element and an armature element, one of which is connected for rotation by said device, and the other of which is fixed, one of said two elements being multi-polar and having its poles disposed in a circle about the axis of rotation of said rotated element.

2. In a speedometer, in combination with a rotating member, a device which responds to change of speed of rotation of said member by assuming a different position for each different speed thereof; a magnet element and an armature element, one of which is connected for rotation by said device and the other of which is fixed, the armature element having a series of soft iron projections disposed in a circle about the axis of rotation of said rotated element, the magnet having one pole adjacent to the circle of such projections.

3. In a speedometer, in combination with a rotating shaft and a device responsive to speed operated by the rotation of the shaft; a train actuated by said speed-responsive device, a part having a series of soft iron projections disposed in a circle and mounted for rotation by said train about an axis through the center of such circle, and a magnet having a pole disposed adjacent to the path of rotation of the projections.

4. In a speedometer, comprising a case, a rotating shaft and a device responsive to speed operated by the rotation of the shaft, the case being provided with a window, a rotatable element bearing a series of numerals all equi-distant from the axis of rotation of said element and positioned for display at the window of the case, a series of soft iron projections corresponding respectively to the aforesaid numerals, connected for rotation with and disposed in a circle about the axis of rotation thereof, a magnet fixed in the case having a pole adjacent to the path of rotation of the projections, and a train connecting the numeral-bearing element with the speed-responsive device.

5. In a speedometer, in combination with a rotating shaft and a device responsive to speed operated by the rotation of the shaft, a train actuated by said speed-responsive device and comprising a units disk and a tens disk rotated by train shafts whose movements of rotation are respectively as ten to one, an annular portion of each disk being provided with a series of numerals, the units shaft being parallel to the tens shaft and the units disk overlapping the tens disk from one side past the center but exposing the said annular portion thereof at one side.

6. In a speedometer, in combination with a rotating shaft and a device responsive to speed operated by the rotation of the shaft, a train actuated by said speed-responsive device and comprising a units disk and a tens disk and rotated by train shafts whose movements of rotation are respectively as ten to one, an annular portion of each disk being provided with a series of numerals, the units shaft being parallel to the tens shaft and the units disk overlapping the tens disk from one side past the center but exposing the said annular portion thereof at one side, and the tens disk having an incomplete annular slot to accommodate the shaft of the units disk.

7. In a speedometer, in combination with a rotating shaft and a device responsive to speed operated by the rotation of the shaft; a train connected with the speed-responsive device; a units wheel rotated by said train; a part rotating synchronously with said units wheel having projections spaced to correspond with the unit spaces of the units wheel, and means presenting a yielding resistance to the movement of said projections at one point in their path.

8. In a speedometer, the combination of a plurality of rotatable indicating members positioned in coöperative relation to each other and provided with numbers for affording a single reading at a given instant of time of the speed of a vehicle, means coöperating with each rotatable member for retarding and arresting the rotation thereof, and actuating mechanism for overcoming the resistance of said retarding and arresting means and for imparting intermittent movement to said indicating members, said actuating mechanism operating to impart movement to said indicating members so that the readings afforded by the indicating members will vary in accordance with an increase or decrease in the speed of a vehicle.

9. In a speedometer, the combination of a plurality of rotatable indicating members positioned in coöperative relation to each other and provided with numbers for affording a single reading at a given moment of time of the speed of a vehicle, separate magnetic devices coöperating with said rotatable members for retarding and arresting the rotation thereof, and actuating means operating by yielding contact with one of said rotatable members for overcoming the resistance of said magnetic devices and imparting an intermittent rotation to said indicating members, said actuating means operating to impart movement to said indicating members so that the readings afforded by the indicating members will vary in accordance with an increase or decrease in the speed of a vehicle.

10. In a speedometer, the combination of rotatable indicating members positioned in coöperative relation to each other, retarding means coöperating with each member, actuating means for directly operating one rotatable member with an intermittent movement, means operated by the intermittently actuated member for operating the other indicating member with a like movement, the two said rotatable members affording a single reading at a given moment of time of the speed of a vehicle, and actuating means operating to impart movement to said indicating members so that the readings afforded by the indicating members will vary in accordance with an increase or decrease in the speed of a vehicle.

11. In a speedometer, the combination of rotatable indicating members positioned in coöperative relation to each other, each of said members being mounted for free rotation, means for retarding the rotation of said indicating members, a transmission shaft, a gear train, means actuated by the gear train for imparting movement to one of said indicating members, and means for actuating the other indicating member in unison with the first named member, said transmission shaft and gear train operating to impart movement to the coöperating indicating members so that the reading afforded thereby will vary in accordance with an increase or decrease in the speed of a vehicle.

12. In a speedometer, the combination of a movable indicating means provided with characters for denoting the speed of a vehicle and arranged in sequential indicating positions, and means to move the indicating means to change the position of the latter with the speed of the vehicle comprising means to yieldingly force the indicating means from one of its indicating positions to another, and means tending to retain the indicating means in a fixed position.

13. In a speedometer, the combination of a movable indicating means provided with characters for denoting the speed of a vehicle, and arranged in sequential indicating positions, means to move the indicating means to change the position of the latter with the speed of the vehicle comprising means to yieldingly force the indicating means from one of its indicating positions to another, and a fixed magnet and a body of magnetic material supported so as to be movable with the indicating means and tending to retain the indicating means in a fixed position.

In testimony whereof, I have hereunto set my hand at Chicago, Illinois, this 12th day of September, 1911.

JOHN K. STEWART.

Witnesses:
 STANHOPE HUDSON,
 C. B. SMITH.